3,435,040
PREPARATION OF ISOQUINOLINES
Goetz E. Hardtmann, Madison, and Hans Ott, Convent Station, N.J., assignors to Sandoz Inc., Hanover, N.J.
No Drawing. Filed June 28, 1965, Ser. No. 467,713
Int. Cl. C07d 35/20, 35/36, 57/02
U.S. Cl. 260—288
4 Claims

ABSTRACT OF THE DISCLOSURE

Hexahydroisoquinolobenzodiazepinones (I) useful as anti-anxiety agents are prepared by (a) reacting a β-phenethylchloride and an o-halobenzonitrile in the presence of stannic chloride or titanium tetrachloride to form a 1-(o-halophenyl)-3,4-dihydroisoquinoline, which is then (b) reacted with an amino compound in the presence of copper powder and cuprous chloride to form a 1-(o-aminophenyl)-3,4-dihydroisoquinoline, which is then (c) reduced to the corresponding 1,2,3,4-tetrahydroisoquinoline compound, which is then (d) condensed with an α-haloacetic acid alkyl ester to form the corresponding 2-carbalkoxymethyl compound, which is then (e) cyclized to (I).

This invention is directed to a process for the preparation of hexahydroisoquinolobenzodiazepinones, particularly pharmaceutically acceptable compounds of the formula

I wherein $R^1$ is either a chlorine atom (—Cl); a fluorine atom (—F); trifluoromethyl (—CF$_3$); or nitro (—NO$_2$);
$R^2$ is either a hydrogen atom (—H); straight chain (preferably lower) alkyl, e.g. methyl, ethyl, propyl and butyl; or benzyl; and
each of $R^3$ and $R^4$ is either a hydrogen atom (—H); lower alkyl, e.g. methyl, ethyl, propyl, isopropyl and butyl; lower alkoxy, e.g. methoxy, ethoxy, propoxy, isopropoxy and butoxy; or, taken together, methylenedioxy (—O—CH$_2$—O—);

and to individual steps in the process. The overall process comprises five steps:

(A) II + III → IV (B) IV + R$^2$—NH$_2$ → V → VI (C) VI → VII (D) VII + Z—CH$_2$—C(=O)—O—R → VIII → IX (E) IX + CH$_3$—O—CH$_2$—CH$_2$—ONa → I wherein R is lower alkyl, e.g. methyl, ethyl, propyl and butyl;
each of X and Z is either a chlorine atom (—Cl) or a bromine atom (—Br); and
each of $R^1$ to $R^4$ has its above-ascribed meaning.

Pharmaceutically acceptable compounds I are useful as anti-anxiety agents. They are administered either orally or parenterally in standard dosage forms, e.g. tablets and capsules, in doses which vary from compound to compound and with the severity of the condition being treated.

Compounds II, III, V and VIII are either known compounds or are prepared by standard procedures from available compounds. Step A is effected under reflux for from 2 to 6 hours with the reactants in contact with either stannic chloride (SnCl$_4$) or titanium tetrachloride (TiCl$_4$). A molar excess of II is employed. Per part by weight of compound II, from about 0.5 to about 1.5 parts by weight (depending upon the molecular weight ratio) of III and from about 0.7 to about 5 parts by volume of the tetrachloride are employed.

Step B is preferably effected in from 2 to 12 hours at a temperature from 50° to 60° C. with the reactants IV and V in contact with copper powder (Cu) and cuprous chloride (CuCl or Cu$_2$Cl$_2$). Both the temperature range and the copper catalyst are essential to obtain particularly good results. Below 50° C. the reaction is unduly slow, and above 60° C. unwanted side-products result. The combination catalyst (Cu plus CuCl) results in good yields. Per part by weight of Compound IV, it is preferred to use from 8 to 20 parts by weight of V, from 0.02 to 0.1 part by weight of Cu and from 0.02 to 0.1 part by weight of CuCl.

Step C is effected under reflux for from 1 to 5 hours in a solvent with sodium borohydride. Per part by weight of VI, from 0.1 to 0.5 part by weight of sodium borohydride and from 10 to 20 parts by volume of solvent are employed. The preferred solvent is ethanol containing up to 20% of water, but this may be replaced by methanol, by propanol, by isopropanol or by diglyme. If diglyme is employed, the temperature is maintained between 60° and 90° C., rather than at reflux.

Step D is also effected under reflux and in a solvent. A tri(lower)alkylamine, e.g. trimethylamine, triethylamine, tripropylamine, ethyldimethylamine and tributylamine, is incorporated in the reaction mixture prior to refluxing. The solvent is, preferably, ethanol, but may also be methanol, propanol or acetone. Refluxing is continued for from 3 to 10 hours within the temperature range of from 55° to 90° C. The molar ratio of VII:VIII:trialkylamine is usually within the range of from 1:(1.1 to 2):(1.1 to 2). From 10 to 50 parts by volume of solvent are employed per part by weight of VII.

For step E compound IX is refluxed in a solvent with sodium methoxyethoxide for from 1 to 6 hours. Although the preferred solvent is β-methoxyethanol, suitable other solvents, such as t.-butanol and isoamyl alcohol, may be used in lieu thereof. The refluxing temperature is usually from 100° to 130° C. Per part by weight of IX, from 0.005 to 0.1 part by weight of sodium methoxyethoxide and from 5 to 50 parts by volume of solvent are employed.

Alternatively, step E (ring closure) is effected by refluxing IX in glacial acetic acid.

In the preceding steps A to E no variation of substituents within the scope of those indicated will preclude the running of any of the reactions under the contemplated conditions.

The following examples illustrate the invention, all temperatures being in degrees centigrade, parts and percentages being in parts by weight unless otherwise specified, and the relationship between parts by weight and parts by volume being the same as that between the kilogram and the liter.

EXAMPLE 1

1-(2-chloro-5-trifluoromethyl-phenyl)-3,4-dihydroisoquinoline hydrochloride

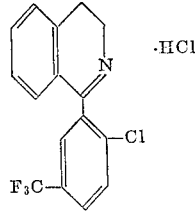

Reflux for 5 hours in 8 parts by volume of stannic chloride a solution of 10 parts of phenylethylchloride and 13 parts of 2-chloro-5-trifluoromethylbenzonitrile. Add with intense cooling (Dry Ice/acetone) to the cooled mixture 25% sodium hydroxide solution until the mixture is alkaline. Extract the very cloudy solution three times with ethylacetate. Filter the organic phase; wash same with water and saturated sodium chloride solution; dry over sodium sulfate and evaporate in vacuo. Dissolve the residue in methylene chloride and saturate with dry hydrogen chloride gas. Addition thereto of diethylether and cooling to 0° yields 7.5 parts of crystalline title compound, melting point (M.P.) 212° to 214° C. The compound may be purified by sublimation at 100° to 0.5 mm. pressure.

Replacing the phenethylchloride with an equivalent of either m-(β-chloroethyl)toluene, p-ethoxyphenethylchloride or 1-(β-chloroethyl)-3,4-methylenedioxybenzene results in the preparation, in similar manner, of the hydrochloride of the corresponding compound IV.

Replacing the 2-chloro-5-trifluoromethylbenzonitrile with an equivalent of either 2,5-dichlorobenzonitrile, 2-bromo-5-nitrobenzonitrile or 2-chloro-5-fluorobenzonitrile results in the preparation, in similar manner, of the hydrochloride of the corresponding compound IV.

EXAMPLE 2

1-(2-methylamino-5-trifluoromethyl-phenyl)-3,4-dihydroisoquinoline

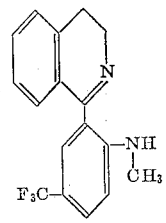

Heat to 55° to 60° (autoclave) in 500 parts by volume of liquid methylamine a mixture of 35 parts of 1-(2-chloro-5-trifluoromethylphenyl)-3,4 - dihydroisoquinoline hydrochloride, 1.7 parts of cuprous chloride and 1.7 parts of copper powder; maintain the resultant at 55° to 60° for 12 hours. Cool the resultant and evaporate the methylamine at room temperature. Treat the thus-obtained residue with 500 parts by volume of methylene chloride; filter off insoluble material. Wash the organic phase twice with water; dry over sodium sulfate and evaporate in vacuo to obtain 32 parts of light yellow oil.

Replacing the methylamine with an equivalent of either ethylamine or benzylamine results in the preparation, in similar manner, of the corresponding compound VI. To obtain compounds VI wherein $R^2$ is a hydrogen atom, liquid ammonia is employed under the same conditions.

Replacing the title compound of Example 1 with either 1-(2-bromo-5-trifluoromethyl-phenyl)-6-methoxy-3,4 - dihydroisoquinoline hydrochloride, 1-(2,5-dichlorophenyl)-7-methyl-3,4-dihydroisoquinoline hydrochloride or either of the corresponding free bases, results in the preparation, in similar manner, of the corresponding compound VI.

EXAMPLE 3

1-(2-methylamino-5-trifluoromethyl-phenyl)-1,2,3,4-tetrahydroisoquinoline

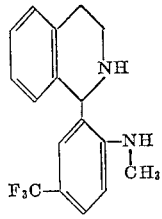

Reflux for two hours in 400 parts by volume of 95% ethanol a mixture of 30 parts of 1-(2-methylamino-5-trifluoromethyl-phenyl)-3,4-dihydroisoquinoline and 8 parts of sodium borohydride. Cool the obtained solution and treat same with 2 N hydrochloric acid to destroy excess sodium borohydride. Alkalize the resultant with 2 N sodium hydroxide solution and distill off the solvent in vacuo until 100 parts by volume remain. Extract the resultant mixture three times with ethylacetate. Wash the organic phase twice with saturated sodium chloride solution; dry same over sodium sulfate and evaporate in vacuo to obtain 12 parts of title compound, M.P. 125° to 129°, crystallized from ethanol.

EXAMPLE 4

1-(2-methylamino-5-trifluoromethyl-phenyl)-2-carbethoxymethyl-1,2,3,4-tetrahydroisoquinoline

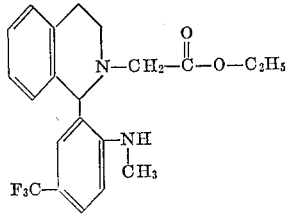

Reflux for five hours in 30 parts by volume of ethanol a mixture of 1 part of 1-(2-methylamino-5-trifluoromethyl-phenyl)-1,2,3,4-tetrahydroisoquinoline, 1 part of ethylbromoacetate and 0.7 part of triethylamine. Evaporate the solvent in vacuo; dissolve the residue in methylene chloride; wash the solution with water; dry same over sodium sulfate and evaporate in vacuo. Distill the oily residue at 130° and 0.5 mm. pressure and crystallize the distillate from pentane to obtain 1.1 parts of title compound, M.P. 80° to 82°.

EXAMPLE 5

5-methyl - 2 - trifluoromethyl - 5,6,7,9,10,14b - hexahydroisoquinolo[2,1-d]-benzo[1,4]diazepin - 6 - one hydrochloride

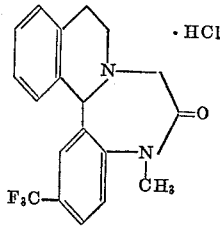

Add to a solution of 0.1 part of metallic sodium in 200 parts by volume of absolute 2-methoxy-ethanol 10 parts of 1-(2-methylamino-5-trifluoromethyl-phenyl)-2-carbethoxymethyl-1,2,3,4-tetrahydroisoquinoline and reflux for one hour. Distill the solvent off in vacuo and dissolve the residue in methylene chloride. Wash the organic phase twice with water; dry oven sodium sulfate and evaporate in vacuo to obtain 9.5 parts of a light brown oil. Dissolve the oil in ethylacetate and saturate the solution with dry hydrogen chloride gas. The hydrochloride precipitates on cooling and melts at 221° to 225°.

The invention and its advantages are readily understood from the foregoing description. Although the several steps have been correlated to produce a specific type of end-product, various changes can be made in the nature and arrangement of the steps and in the starting materials and intermediates to which they are applied without departing from the spirit and scope of the invention or sacrificing its material advantages. Exemplifications set forth herein are merely illustrative embodiments.

What is claimed is:

1. A process for preparing a 1-(ortho-X)-phenyl-3,4-dihydroisoquinoline which comprises refluxing for from 2 to 6 hours a mixture of an o-halobenzonitrile of the formula

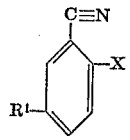

wherein
R$^1$ is a member selected from the group consisting of a chlorine atom, a fluorine atom, trifluoromethyl and nitro; and
X is a member selected from the group consisting of a chlorine atom and a bromine atom;
a molar excess of a β-phenethylchloride of the formula

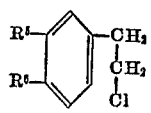

wherein
each of R$^5$ and R$^6$ is a member selected from the group consisting of a hydrogen atom, straight chain alkyl having from 1 to 4 carbon atoms and straight chain alkoxy having from 1 to 4 carbon atoms and, taken together, methylenedioxy;
and from about 0.7 to about 5 parts by volume of a member selected from the group consisting of stannic chloride and titanium tetrachloride per part by weight of the β-phenethylchloride, the relationship of parts by weight to parts by volume being the same as that between the kilogram and the liter.

2. A process for preparing a 1-(o-amino)phenyl-3,4-dihydroisoquinoline which comprises maintaining at a temperature within the range of from 50° to 60° C. a compound of the formula

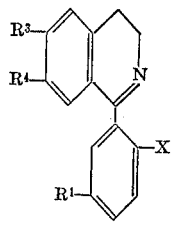

wherein
R$^1$ is a member selected from the group consisting of a chlorine atom, a fluorine atom, trifluoromethyl and nitro;
each of R$^3$ and R$^4$ is a member selected from the group consisting of a hydrogen atom, straight chain alkyl having from 1 to 4 carbon atoms and straight chain alkoxy having from 1 to 4 carbon atoms and, taken together, methylenedioxy;
X is a member selected from the group consisting of a chlorine atom and a bromine atom;
in contact with a compound of the formula

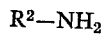

wherein
R$^2$ is a member selected from the group consisting of a hydrogen atom, straight chain lower alkyl and benzyl;
and in contact with a catalyst comprising cuprous chloride and copper powder.

3. A process according to claim 1 wherein R$^1$ is trifluoromethylene, X is a chlorine atom and R$^5$ and R$^6$ are both hydrogen atoms.

4. A process according to claim 2 wherein R$^1$ is trifluoromethyl, R$^2$ is methyl, X is a chlorine atom, and R$^3$ and R$^4$ are both hydrogen atoms.

References Cited

UNITED STATES PATENTS

| | | | |
|---|---|---|---|
| 2,634,292 | 4/1953 | Hellerback | 260—286 X |
| 2,778,833 | 1/1957 | Surrey | 260—286 |
| 3,205,233 | 9/1965 | Clarkson | 260—288 |

ALEX MAZEL, *Primary Examiner.*

D. G. DAUS, *Assistant Examiner.*

U.S. Cl. X.R.

260—289, 239.3, 465, 287, 651, 999